US008406726B2

(12) United States Patent
Youn et al.

(10) Patent No.: US 8,406,726 B2
(45) Date of Patent: Mar. 26, 2013

(54) METHOD OF EMERGENCY COMMUNICATION IN MOBILE COMMUNICATION SYSTEM AND MOBILE STATION SUPPORTING THE SAME

(75) Inventors: Ae Ran Youn, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 806 days.

(21) Appl. No.: 12/530,117

(22) PCT Filed: Mar. 6, 2008

(86) PCT No.: PCT/KR2008/001279
§ 371 (c)(1),
(2), (4) Date: Sep. 18, 2009

(87) PCT Pub. No.: WO2008/108591
PCT Pub. Date: Sep. 12, 2008

(65) Prior Publication Data
US 2010/0120392 A1 May 13, 2010

(30) Foreign Application Priority Data
Mar. 7, 2007 (KR) .................. 10-2007-0022471

(51) Int. Cl.
*H04M 11/04* (2006.01)
(52) U.S. Cl. .................. 455/404.1; 455/11.1; 455/13.1; 455/41.2; 455/560; 455/442; 455/423; 455/450; 455/522; 455/509; 370/229; 370/352; 370/235; 370/241; 370/401; 370/467; 370/281; 370/277; 370/329; 370/330; 370/312; 370/315; 370/331
(58) Field of Classification Search .............. 455/404.1, 455/521, 11.1, 13.1, 41.2, 560, 442, 10, 456.1, 455/423, 450, 455, 9, 436, 452.2, 522, 509, 455/574, 438; 379/45; 370/229, 352, 230, 370/235, 241, 401, 221.01, 467, 281, 277, 370/329, 338, 330, 312, 315, 331
See application file for complete search history.

(56) References Cited

U.S. PATENT DOCUMENTS 6,363,065 B1 * 3/2002 Thornton et al. ............. 370/352
6,665,293 B2 * 12/2003 Thornton et al. ............. 370/352
(Continued)

FOREIGN PATENT DOCUMENTS

WO WO 2006/104353 A2 10/2006
WO WO 2009/091191 A2 7/2009

OTHER PUBLICATIONS

Okuda et al., "MS Network Entry for Transparent Relay Station," IEEE 802.16 Broadband Wireless Access Working Group, IEEE C802 16j-007/001r4 [online], Jan. 18, 2007 [retrieved on Dec. 30, 2009]<URL:http://www.ieee802.org/16/relay/contrib/C80216J-07_001r4.pdf>.
Saifullah et al., "Resource Request for Bandwidth," IEEE 802.16 Broadband Wireless Access Working Group, IEEE C802.16j-07/039r3 [online], Jan. 18, 2007 [retrieved on Dec. 30, 2009] <URL:http://www.ieee802.org/16/relay/contrib/C80216j-07_039r3.pdf> XP003022068.

*Primary Examiner* — Joseph Arevalo
(74) *Attorney, Agent, or Firm* — Birch, Stewart, Kolasch & Birch, LLP

(57) ABSTRACT

The present invention relates to a method and apparatus for requesting a base station of emergency call connection within the shortest time regardless of location or channel status of a mobile station in a mobile communication system. When the mobile station requests an uplink to connect emergency call, the base station establishes a communication path of mobile station-relay station-base station if signal quality of the mobile station is not better than signal quality transmitted through the relay station, whereby ranging or transmission of emergency data is prevented from being repeated under poor channel status, so as to enable a prompt emergency rescue service.

5 Claims, 5 Drawing Sheets

U.S. PATENT DOCUMENTS

| | | |
|---|---|---|
| 7,486,928 B2 * | 2/2009 | Izumikawa et al. .......... 455/11.1 |
| 8,131,253 B2 * | 3/2012 | Kang et al. ................. 455/404.1 |
| 2006/0264172 A1 * | 11/2006 | Izumikawa et al. .......... 455/11.1 |
| 2008/0057894 A1 * | 3/2008 | Aleksic et al. ............. 455/187.1 |
| 2008/0080369 A1 * | 4/2008 | Sumioka et al. .............. 370/229 |
| 2010/0003990 A1 * | 1/2010 | Suemitsu et al. ............. 455/442 |

\* cited by examiner

METHOD OF EMERGENCY COMMUNICATION IN MOBILE COMMUNICATION SYSTEM AND MOBILE STATION SUPPORTING THE SAME

TECHNICAL FIELD

The present invention relates to a method and apparatus for requesting a base station of emergency call connection within the shortest time regardless of location or channel status of a mobile station in a mobile communication system.

BACKGROUND ART

In a mobile communication system which supports an orthogonal frequency division multiple access (OFDMA), if a mobile station enters a new cell, the mobile station performs an initialization procedure with a base station of the corresponding cell. An example of such an initialization procedure includes ranging. Ranging means a procedure of aligning receiving frame (Rx frame) of the base station so that the mobile station can support a physical (PHY) layer of OFDMA, and obtaining right timing offset and power adjustment values received within a corresponding receiving threshold value.

A ranging procedure based OFDMA will be described in more detail.

A ranging procedure between the base station and the mobile station can be divided into initial ranging and periodic ranging. The initial ranging is performed when handover is performed due to power-on of the mobile station or motion of the mobile station between cells. The periodic ranging is periodically performed with a serving base station (serving BS) or performed by request of the base station when it is determined that a signal status is poor. Hereinafter, the initial ranging procedure will be described.

The mobile station downlink (DL)-synchronizes with the base station and acquires uplink transmitter parameters (S101). Subsequently, the mobile station randomly selects any one of slots of a ranging subchannel allocated within a frame structure (S102). The mobile station forwards a ranging request message (RNG-REQ message) to the base station through the selected slot by using a random initial ranging code (S103).

In a broadband wireless access system which uses OFDMA, the mobile station can perform ranging request and uplink bandwidth request for adjusting uplink transmission parameters by using CDMA code. In this case, the base station forwards CDMA code sets for ranging and bandwidth request to mobile stations in a broadcast type through an uplink channel descriptor (UCD) message. The mobile station randomly selects a proper ranging mode among CDMA codes includes in the UCD message and transmits the selected ranging mode to an uplink bandwidth allocated for ranging. Examples of a ranging mode that can be selected include initial ranging, handover ranging, periodic ranging, and bandwidth request ranging. The base station competitively allocates a ranging interval, which is an uplink bandwidth for ranging, to mobile stations through uplink map information element (UM_IE) included in an uplink map (UL-MAP).

The base station which has received CDMA code (or ranging code) from the mobile station sets a transmission power adjustment value, time and frequency adjustment values, and ranging status, which are required for uplink transmission synchronization, and forwards the set values to the mobile station through a ranging response message (RNG-RSP message) (S104). In this case, if the uplink transmission parameters are completely adjusted, the ranging status is set to 'success.' Also, the base station allocates an uplink bandwidth by transmitting CDMA allocation information element (CDMA_Allocation_IE) to the mobile station, so that the corresponding mobile station can transmit the ranging request message (RNG-REQ) (S105). However, if the ranging status is set to 'continue,' the mobile station returns to step S102 and repeats steps S103 to S105 until the ranging status is set to 'success.'

The mobile station which has been allocated with the uplink bandwidth forwards the ranging request message (RNG-REQ) to the base station, wherein the ranging request message includes identifier (MAC address) of the mobile station (S106). The base station which has received the ranging request message forwards the ranging response message (RNG-RSP) to the mobile station, wherein the ranging response message includes Basic Management CID and Primary Management CID (S107).

Since the aforementioned initial ranging procedure is performed through a contention based uplink interval, if there exist a plurality of mobile stations which perform ranging at the same time, collision may occur between the respective mobile stations. In other words, if the mobile station has forwarded ranging request to the base station but has not received ranging response from the base station for a certain time, since this means that collision occurs, the mobile station again transmits ranging response to the base station.

However, when the mobile station requests an emergency rescue service or intends to transmit emergency data, if emergency call connection is delayed due to such a collision of ranging request, it may cause a serious problem. Also, if the mobile station is located at the boundary of a cell or its power is weak, a problem may occur in that the mobile station should perform ranging request to the base station several times separately from the collision. Especially, even in case that the mobile station has been allocated with resources through uplink bandwidth request, emergency data have not been transmitted at one time, whereby the mobile station should perform a request of resource allocation several times. As a result, a problem occurs in that emergency call connection may be delayed.

DETAILED DESCRIPTION OF THE INVENTION

Technical Problems

Accordingly, the present invention is directed to a method of emergency communication in a mobile communication system and a mobile station supporting the same, which substantially obviate one or more problems due to limitations and disadvantages of the related art. An object of the present invention is to provide an emergency call connection service without delay in an emergency status by establishing various call connection paths such as mobile station-base station or mobile station-relay station-base station in accordance with channel status of a mobile station.

Technical Solutions

To achieve the object and other advantages and in accordance with the purpose of the invention, as embodied and broadly described herein, a method of emergency communication in a mobile communication system includes establishing a direct communication path between a base station and a mobile station and allocating a third uplink bandwidth for ranging request of the mobile station if a signal quality value of an emergency code directly received from the mobile station is greater than a signal quality value of an emergency code received through a relay station, allocating a fourth uplink bandwidth for a request of a service flow setup of the mobile station if size of emergency data and information of the mobile station are received from the mobile station through the third uplink bandwidth, and receiving the request of the service flow setup from the mobile station through the fourth uplink bandwidth. In this case, the method further includes reporting to the mobile station whether to support a corresponding service if the request of the service flow setup is received from the mobile station through the fourth uplink bandwidth.

In another aspect of the present invention, a method of emergency communication in a mobile communication system includes transmitting a random emergency code among emergency codes, which are broadcasted from a base station, to the base station, transmitting size of emergency data and information of the mobile station to a communication path established by the base station through an uplink bandwidth allocated by the base station for ranging request, and transmitting a request of a service flow setup to the communication path established by the base station through an uplink bandwidth allocated by the base station for the request of the service flow setup. The mobile station can be reported from the base station whether to support a corresponding service in response to the request of the service flow setup.

In the above aspects, the request of emergency call connection is performed in such a manner that the base station selects a random emergency code from uplink channel information previously broadcasted from the base station and transmits the selected emergency code to the base station.

Preferably, in the step of allocating the uplink bandwidth for ranging request, the base station can transmit information of the allocated uplink bandwidth to the mobile station through an uplink information element of an uplink map.

Meanwhile, if a signal quality value of an emergency code transmitted from the mobile station to the base station for the request of emergency call connection is greater than a predetermined reference value, a direction transmission path between the mobile station and the base station can be established.

Selectively, for the request of emergency call connection, the mobile station can compare the signal quality value of the emergency code directly transmitted from the mobile station to the base station with the signal quality value of the emergency code transmitted through the relay station so as to establish a path having the better signal quality value as a communication path.

Preferably, the emergency code directly received from the mobile station and the emergency code received through the relay station can include a code for identifying a transmission start source of the emergency code.

Furthermore, the emergency code directly received from the mobile station and the emergency code received through the relay station can be transmitted through different emergency code transmission bandwidths.

ADVANTAGEOUS EFFECTS

According to the present invention, since an optimized communication path for receiving an emergency rescue service can automatically be established depending on channel status of a mobile station, repetition of ranging or repetitive transmission of emergency data due to channel degradation is minimized, whereby the emergency rescue service can be provided without delay.

BEST MODE FOR CARRYING OUT THE INVENTION

Figure 1:
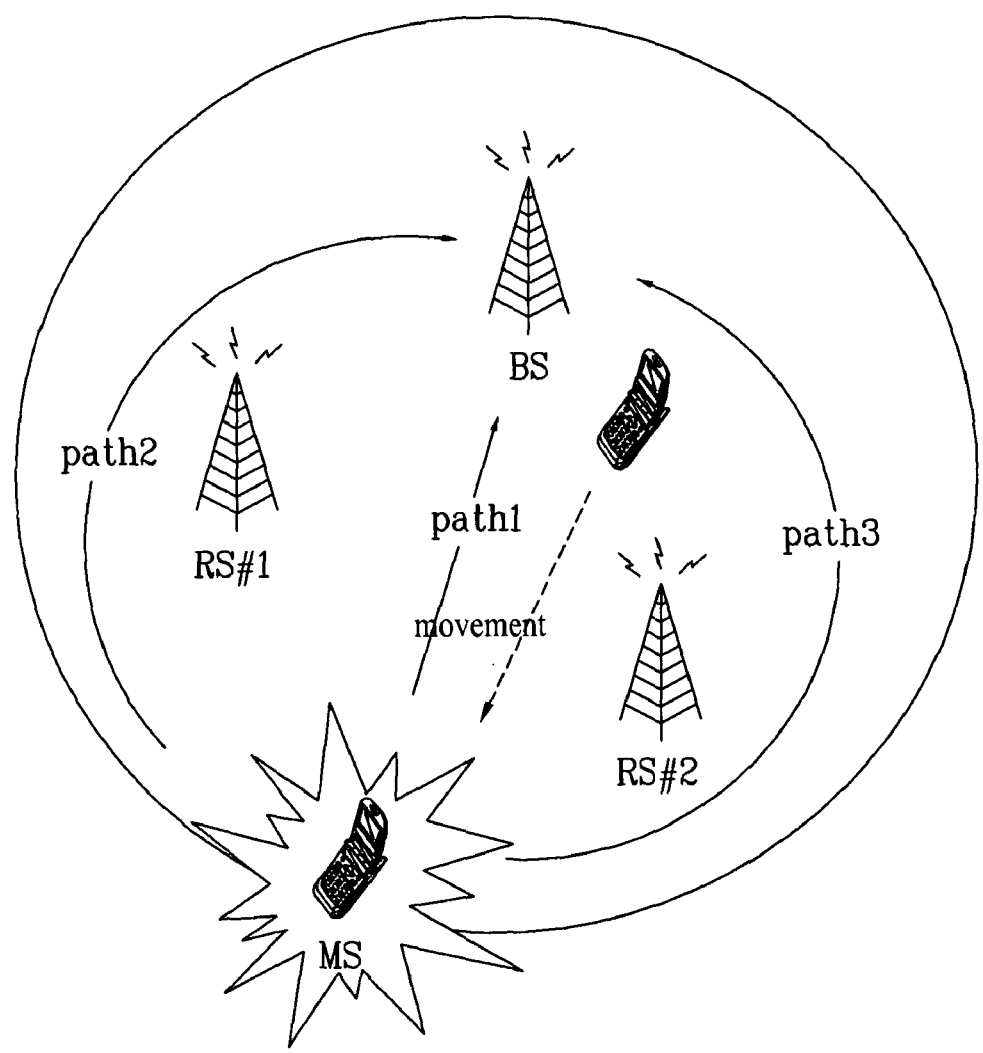
FIG. 1 illustrates a scenario for formation of a communication path for an emergency rescue service.

Reference will now be made in detail to the preferred embodiments of the present invention, examples of which are illustrated in the accompanying drawings. However, it will be apparent to those skilled in the art that various modifications and variations can be made in the following embodiment of the present invention, and the scope of the present invention is not limited to the following embodiment.

Generally, a wireless emergency service can be classified into a wireless emergency rescue service and a wireless emergency alert service. The wireless emergency rescue service means a service for supporting safe rescue by identifying location of a mobile station of a corresponding user when fire, crime, and other emergency status occur to the user. The wireless emergency alert service is a service for providing emergency notification such as storm warning, imminent earthquake and tidal waves warning, and atomic, biological and chemical accidents, to wireless subscribers within a given geographic place. The emergency alert service serves to broadcast an alert message to all mobile stations located in a specific zone.

The present invention has been suggested to aim for the wireless emergency rescue service, and is intended to selectively include a relay station (RS) in a communication path depending on location and channel status of a mobile station in establishing the communication path for emergency call connection, thereby minimizing communication delay that may occur in a call connection procedure.

Meanwhile, the relay station can be classified into two types. The first type of the relay station is an analog type relay station which serves to simply amplify a signal received from the base station and transmit the amplified signal to the mobile station. The second type of the relay station can communicate with the mobile station in a wireless mode unlike an access point (AP) of a wireless LAN or a base station of a mobile communication system, which is connected with a backbone in a wire mode. Also, the second type of the relay station can be continuously supplied with the power through a peripheral communication environment. Moreover, unlike the first type of the relay station, the second type of the relay station is to decode a received signal, process the decoded signal, and transmit the processed signal to the mobile station or the base station through next frame in addition to amplifying the signal. The relay station according to the present invention is based on the second type of the relay station.

In the present invention, the mobile station is to request an emergency rescue service in a state that it is subscribed to the base station after undergoing an initialization procedure in a current cell to which the mobile station belongs. The procedure of initiating the mobile station, which has entered the cell, in the base station will be described in brief.

After entering a new cell, the mobile station performs channel scan starting from a downlink channel which has been used most recently, finds an available downlink channel, and synchronizes with the base station. The mobile station performs ranging by receiving an uplink channel descriptor message (UCD message) broadcasted from the base station, thereby adjusting uplink transmission parameters and acquiring basic Connection ID and primary Connection ID.

After ranging is performed, the base station performs authentication for the mobile station. The authenticated mobile station is subscribed to the base station. The mobile station managed by IP (Internet Protocol) is allocated with secondary management Connection ID from the base station and sets IP. The mobile station which has finished IP connection sets current date and time, downloads its configuration file from a TFTP server, and sets connection of a service which is previously prepared.

Under the circumstances, if the mobile station intends to request the base station of an emergency rescue service as emergency status occurs in the mobile station, in order to establish a communication path between the mobile station and the base station, two types of cases may be considered as follows. For reference, FIG. 1 illustrates a scenario for formation of a communication path for an emergency rescue service.

<Embodiment 1>

Figure 2:
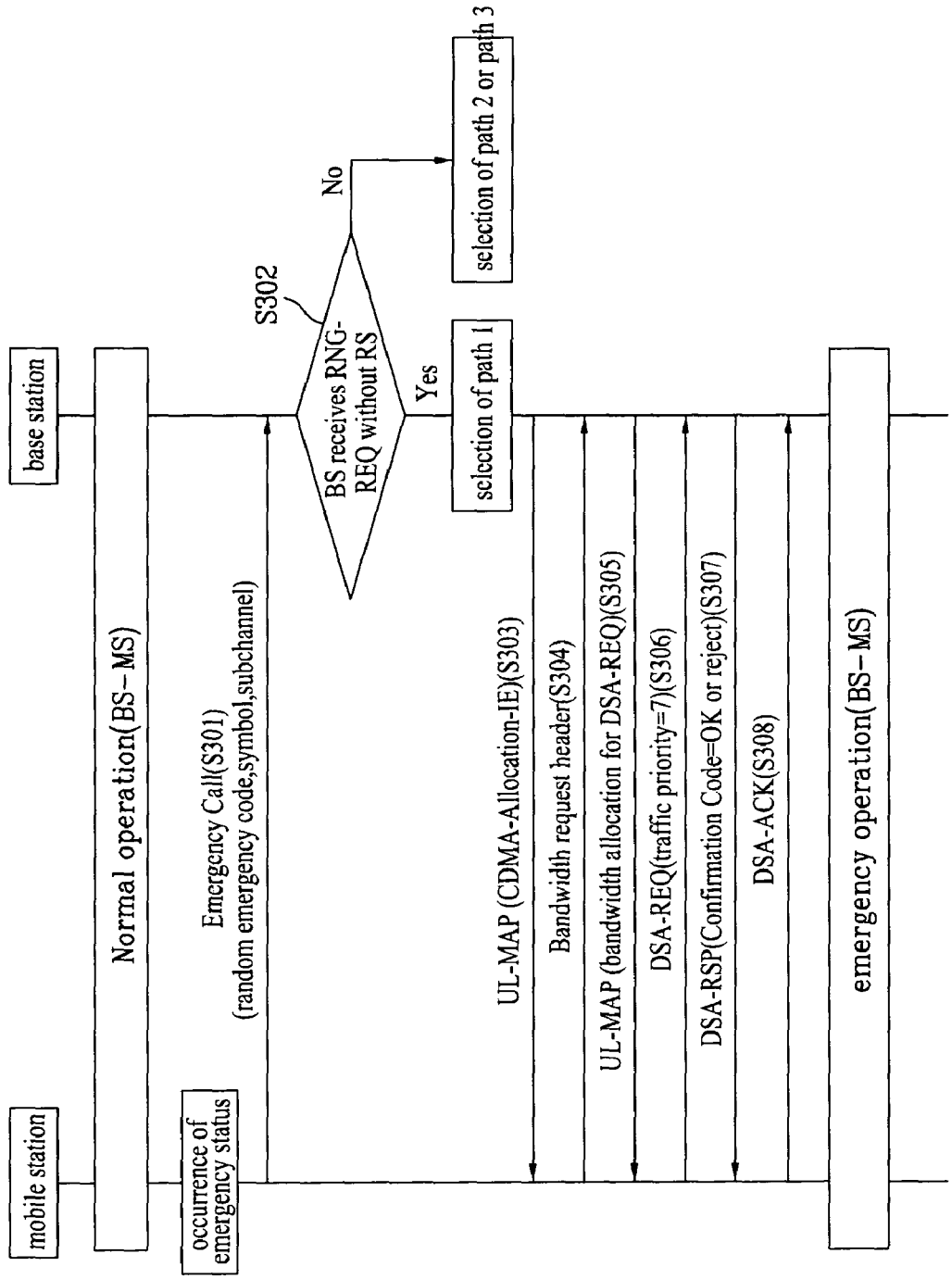
FIG. 2 is a signal flow chart illustrating an emergency rescue request scenario performed through path 1 of FIG. 1.

This embodiment relates to a case where a communication path for an emergency rescue service between the mobile station and the base station is directly established as the channel status of the mobile station is better than a reference value, channel adjustment through ranging is not required, or it is not necessary to consider power consumption of the mobile station. FIG. 2 is a signal flow chart illustrating an emergency rescue request scenario performed through path 1 of FIG. 1.

The base station usually performs broadcasting to mobile stations within a cell by including an emergency CDMA code in an uplink channel descriptor message (UCD message) (general action between the mobile station and the base station).

Table 1 illustrates an example of an UCD message and ranging related TLV parameters included in the UCD message.

TABLE 1

| Syntax | Size | Notes |
|---|---|---|
| UCD_Message_Format( ) { | | |
| Management Message Type = 0 | 8 bits | |
| Configuration Change Count | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded information for the overall channel | variable | TLV specific |
| Begin PHY Specific Section { | | See applicable PHY section. |
| for(i= 1; i <= n; i++) { | | For each uplink burst profile 1 to n. |
| Uplink_Burst_Profile | variable | PHY specific |
| } | | |
| } | | |
| } | | |

If an emergency status occurs in the mobile station, the mobile station selects a random emergency code among emergency CDMA codes included in the UCD message received from the base station, and transmits the selected emergency code to the base station through a first uplink bandwidth (for example, subchannel allocated by UIUC=12, and slot configured by symbols) which is previously allocated (S301). In this case, it is supposed that UIUC=12 designates CDMA ranging and CDMA bandwidth request. Table 2 illustrates an example of TLV parameters related to CDMA codes and emergency codes for ranging and bandwidth request included in the UCD message of Table 1.

TABLE 2

| Name | Type (1 byte) | Length | Value |
|---|---|---|---|
| Start of ranging codes group | 155 | 1 | Indicates the starting number, S, of the group of codes used for this uplink. If not specified, the default value shall be set to zero. All the ranging codes used on this uplink will be between S and ((S + O + N + M + L + P) mod 256). Where, N is the number of initial-ranging codes M is the number of periodic-ranging codes L is the number of bandwidth-request codes O is the number of handover-ranging codes P is the number of emergency request codes The range of values is 0 = S = 255. |
| Initial ranging codes | 150 | 1 | Number of initial ranging CDMA codes. Possible values are 0x55. |
| Periodic ranging codes | 151 | 1 | Number of periodic ranging CDMA codes. Possible values are 0x55. |
| Bandwidth request codes | 152 | 1 | Number of bandwidth request codes. Possible values are 0x55. |
| Handover ranging codes | 194 | 1 | Number of handover ranging CDMA codes. Possible values are 0x55 |
| Emergency request codes | 199 | 1 | Number of emergency ranging CDMA codes. Possible values are 0-255. |

The first uplink bandwidth is a contention based ranging interval allocated from the base station to the mobile stations through an uplink map information element (UL-MAP_IE), and can be divided into an initial ranging interval, a handover ranging interval, a periodic ranging interval, a bandwidth ranging interval, and an emergency call request ranging interval depending on usage of ranging. At this time, the emergency call request ranging interval may be allocated separately from the other ranging intervals, or may be allocated simultaneously with the other ranging intervals.

In this case, UL-MAP is to define a method for using an uplink for offset of a burst related to Allocation Start Time, and Table 3 illustrates an example of the uplink map information element (UL-MAP_IE) of the uplink map.

TABLE 3

| Syntax | Size | Notes |
|---|---|---|
| UL-MAP_IE( ) { | | |
| CID | 16 bits | |
| UIUC | 4 bits | |
| if (UIUC == 12) { | | |
| OFDMA Symbol offset | 8 bits | |
| Subchannel offset | 7 bits | |
| No. OFDMA Symbols | 7 bits | |
| No. Subchannels | 7 bits | |
| Ranging Method | 2 bits | 0b00: Initial Ranging/Handover Ranging over two symbols<br>0b01: Initial Ranging/Handover Ranging over four symbols<br>0b10: BW Request/Periodic Ranging/Emergency Request over one symbol<br>0b11: BW Request/Periodic Ranging/Emergency Request over three symbols |
| Reserved | 1 bit | Shall be set to zero |
| } else if (UIUC == 14) { | | |
| CDMA_Allocation_IE( ) | 32 bits | |
| Else if (UIUC == 15) { | | |
| Extended UIUC dependent IE | variable | See clauses following 8.4.5.4.3 |
| } else { | | |
| Duration | 10 bits | In OFDMA slots (see 8.4.3.1) |
| Repetition coding indication | 2 bits | 0b00: No repetition coding 0b01 Repetition coding of 2 used 0b10 Repetition coding of 4 used 0b11 Repetition coding of 6 used |
| } | | |
| Padding nibble, if needed | 4 bits | Completing to nearest byte, shall be set to 0. |
| } | | |

In Table 3, usage of an information element constituting the UL-MAP is defined by uplink interval usage code (UIUC) per connection ID (CID), and location of each ranging interval is defined by 'Duration.' Usage per ranging interval is defined in accordance with UIUC value used in the UL-MAP, and each interval starts from a point away from a start point of a previous information element (IE) by 'duration' defined in the UL-MAP information element (IE).

The base station which has received the emergency code from the mobile station determines whether the channel status between the mobile station and the base station is good (S302). This will now be described in detail.

Relay stations (for example, RS #1 and RS #2 of FIG. 1) adjacent to the mobile station as well as the base station also receive the emergency code from the mobile station. The relay stations store information of uplink signal quality value (signal quality value between the mobile station and the relay station) when receiving the emergency code from the mobile station. The relay stations select a random emergency code from the UCD message received from the base station, and transmit the selected emergency code to the base station through the first uplink bandwidth which is previously allocated.

The base station determines a communication path to be established by comparing a signal quality value when directly receiving the emergency code from the mobile station with a signal quality value when receiving the emergency code from the relay stations. The following two methods can be used for such a comparison of the signal quality values, as the case may be.

First, if an interval where the mobile station transmits the emergency code is the same as an interval where the relay station transmits the emergency code, the difference in receiving time for one uplink frame is used. In other words, the relay station receives the emergency code from the mobile station and transmits a random emergency code to the base station along with next frame. Accordingly, if two or more emergency codes are transmitted through next frame, it means that relay stations equivalent to the corresponding emergency codes exist. At this time, if a signal quality value of the emergency code transmitted from the mobile station to the base station through a previous frame is more excellent than that of the emergency code transmitted through next frame, it is determined to establish a direct communication path between the base station and the mobile station. If not so, it is determined to establish a communication path through the relay station.

Second, if the interval where the mobile station transmits the emergency code is different from the interval where the relay station transmits the emergency code, the signal quality values of the emergency codes received per interval are compared with each other to determine a communication path.

As will be aware of it from the aforementioned description, the base station should basically identify the emergency code directly received from the mobile station from the emergency code received from the relay station. To this end, if an emergency code transmission bandwidth of the mobile station is the same as that of the relay station, the uplink frame can include predetermined code information for identifying a transmission start source of the emergency code. Also, if the emergency code transmission bandwidth of the mobile station is different from that of the relay station, the base station receives the emergency code by identifying the respective bandwidths from each other.

As a result of determination in step S302, if the channel status of the mobile station is better than the reference value, if channel adjustment through ranging is not required, or if it is not necessary to consider power consumption of the mobile station even though the channel status of the mobile station is not good, the base station allocates a third uplink bandwidth through an uplink information element (for example, CDMA-Allocation_IE) of the uplink map (UL-MAP) so that the corresponding mobile station can perform ranging request (S303). Table 4 illustrates an example of the uplink information element (CDMA-Allocation_IE) transmitted from the base station.

TABLE 4

| Syntax | Size | Notes |
|---|---|---|
| CDMA_Allocation_IE( ) { | | |
| Duration | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |

TABLE 4-continued

| Syntax | Size | Notes |
|---|---|---|
| Ranging Code | 8 bits | |
| Ranging Symbol | 8 bits | |
| Ranging subchannel | 7 bits | |
| BW request mandatory | 1 bit | 1 = yes, 0 = no |
| } | | |

The mobile station transmits size of emergency data and its information, which are to be transmitted later through the third uplink bandwidth, to the base station so as to request uplink bandwidth allocation (S304). The base station allocates a fourth uplink bandwidth to the corresponding mobile station through the uplink map (UL-MAP) (S305).

The mobile station transmits a message, for example, Dynamic Service Addition REQuest (DSA-REQ) for setting a service flow to the base station through the fourth uplink bandwidth (S306). At this time, since the DSA-REQ message is to set an emergency rescue service, it is preferable to set traffic priority of the corresponding message at the highest level (for example, Traffic Priority=7). Also, an emergency service can be set by an uplink grant scheduling type of the DSA-REQ message. Table 5 illustrates an example of the uplink grant scheduling type included in the DSA-REQ message.

TABLE 5

| Type | Length | Value | Scope |
|---|---|---|---|
| [145/146].11 | 1 | 0: Reserved<br>1: for Undefined<br>(BS implementation-<br>dependenta)<br>2: for BE (default)<br>3: for nrtPS<br>4: for rtPS<br>5: for Extended rtPS<br>6: for UGS<br>7: for Emergency Service<br>8-255: Reserved | DSA-REQ<br>DSA-RSP<br>DSA-ACK |

The base station identifies information of the mobile station through the DSA-REQ message, and transmits a response message (DSA-RSP) to the corresponding mobile station, wherein the response message includes information as to whether the emergency rescue service requested from the mobile station can be provided (S307). At this time, whether the emergency rescue service can be provided can be set through a predetermined confirmation code which is previously determined. Table 6 illustrates an example of the confirmation code.

TABLE 6

| CC | Status |
|---|---|
| 0 | OK/success |
| 1 | reject-other |
| 2 | reject-unrecognized-configuration-setting |
| 3 | reject-temporary/reject-RSPource |
| 4 | reject-permanent/reject-admin |
| 5 | reject-not-owner |
| 6 | reject-service-flow-not-found |
| 7 | reject-service-flow-exists |
| 8 | reject-required-parameter-not-present |
| 9 | reject-header-suppression |
| 10 | reject-unknown-transaction-id |
| 11 | reject-authentication-failure |
| 12 | reject-add-aborted |

TABLE 6-continued

| CC | Status |
|---|---|
| 13 | reject-exceeded-dynamic-service-limit |
| 14 | reject-not-authorized-for-the-requested-SAID |
| 15 | reject-fail-to-establish-the-requested-SA |
| 16 | reject-not-supported-parameter |
| 17 | reject-not-supported-parameter-value |
| 18 | OK-emergency service |
| 19 | reserved |
| 20 | reserved |

In this case, if the emergency rescue service is provided, the base station transmits the confirmation code set to 18 (Confirmation Code=18). If the emergency rescue service is not provided, the base station reports reject by setting the confirmation code to any one of 1 to 17 (Confirmation Code=1 to 17).

Afterwards, the mobile station transmits an acknowledgement message (DSA-ACK) to the base station in response to the DSA-RSP message (S308), and connects call with the base station, so as to receive the emergency rescue service.

<Embodiment 2>

Figure 3:
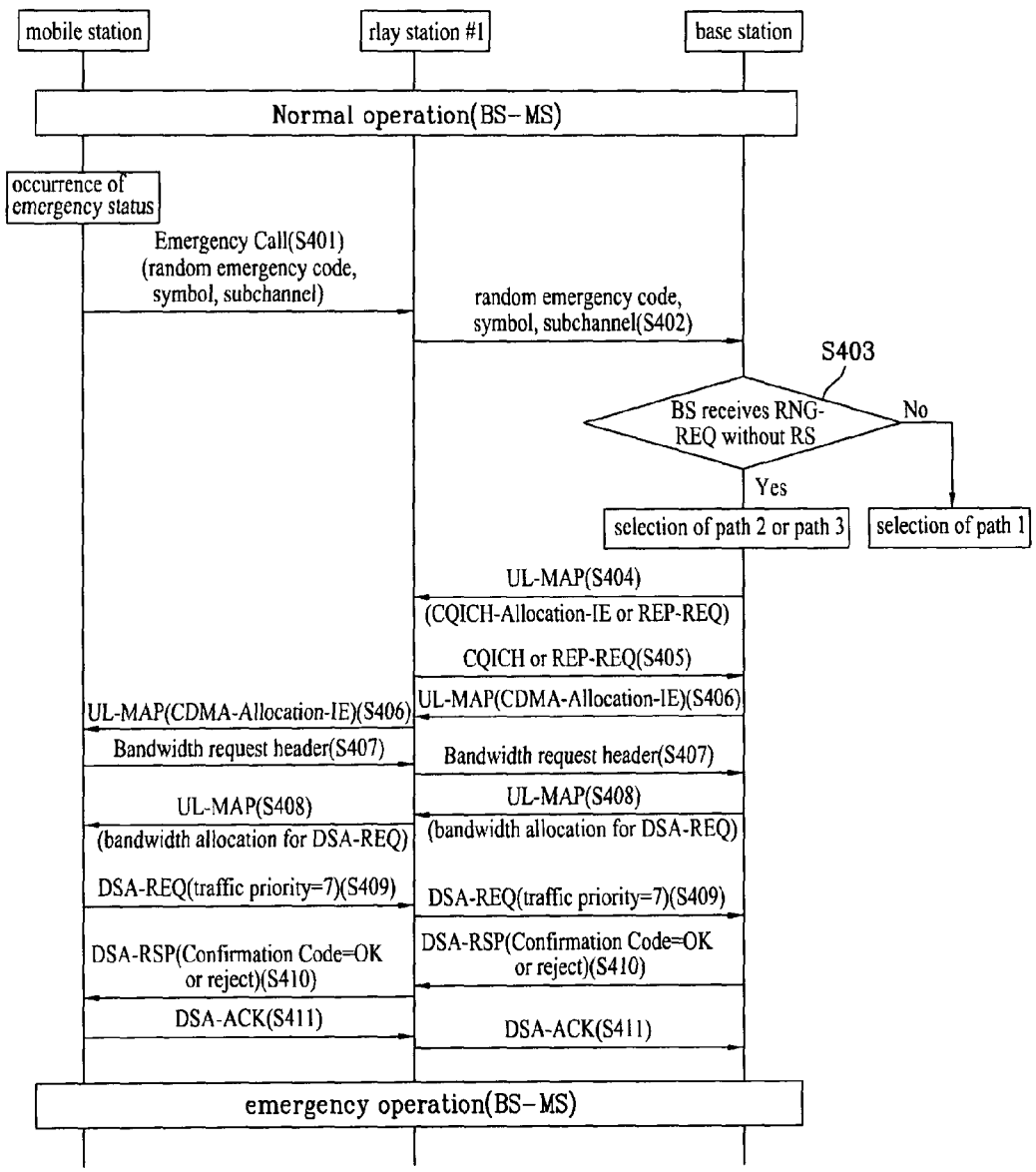
FIG. 3 is a signal flow chart illustrating an emergency rescue request scenario performed through path 2 of FIG. 1.

This embodiment relates to a case where a communication path is established through a relay station located between the mobile station and the base station. FIG. 3 is a signal flow chart illustrating an emergency rescue request scenario performed through path 2 of FIG. 1.

If an emergency status occurs in the mobile station, the mobile station selects a random emergency code among emergency CDMA codes included in the UCD message received from the base station, and transmits the selected emergency code to a peripheral relay station through a first uplink bandwidth (for example, subchannel allocated by UIUC=12, and slot configured by symbols) which is previously allocated (S401). As illustrated in FIG. 1, supposing that two relay stations exist in the vicinity of the mobile station, if the emergency code is received in the relay station #1 and the relay station #2, each relay station stores information of an uplink signal quality value (signal quality value between the mobile station and the relay station) when receiving the emergency code from the mobile station, in a memory. Each relay station selects a random emergency code from the UCD message previously received from the base station and transmits the selected emergency code to the base station (S402).

The base station selects an optimized communication path by comparing a signal quality value of the mobile station, which is directly received from the mobile station without through the relay station, with signal quality values received through the respective relay stations (S403).

The base station allocates a second uplink bandwidth through an uplink information element (for example, CQICH-Allocation_IE) of the uplink map (UL-MAP) so that each relay station can transmit the stored signal quality information to the uplink (S404). Each relay station transmits an acknowledgement message (for example, REP-RSP) to the uplink information element or the stored signal quality information (for example, CQICH) to the base station through the second uplink bandwidth (S405).

If the communication path through the relay station #1 is selected in step S403, the base station allocates a third uplink bandwidth to the relay station #1 through an uplink information element (for example, CDMA-Allocation_IE) of the uplink map (UL-MAP) so that the corresponding mobile station can perform ranging request (S406).

If the mobile station transmits size of emergency data and its information, which are to be transmitted later through the third uplink bandwidth, to the relay station, the relay station transmits the corresponding information to the base station (S407). The base station which has received the corresponding information allocates a fourth uplink bandwidth to the corresponding mobile station through the uplink map (UL-MAP) (S408).

The mobile station transmits a message (DSA-REQ) for setting a service flow to the relay station through the fourth uplink bandwidth, and the relay station transmits the message to the base station (S409). At this time, since the DSA-REQ message is to set an emergency rescue service, it is preferable to set traffic priority of the corresponding message at the highest level (for example, Traffic Priority=7). Also, an emergency service can be set by an uplink grant scheduling type of the DSA-REQ message.

The base station identifies information of the mobile station through the DSA-REQ message, and transmits a response message (DSA-RSP) to the corresponding mobile station through the relay station, wherein the response message includes information as to whether the emergency rescue service requested from the mobile station can be provided (S410). At this time, whether the emergency rescue service can be provided can be set through a predetermined confirmation code which is previously determined. In this case, if the emergency rescue service is provided, the base station transmits the confirmation code set to 18 (Confirmation Code=18). If the emergency rescue service is not provided, the base station reports reject by setting the confirmation code to any one of 1 to 17 (Confirmation Code=1 to 17).

Afterwards, the mobile station transmits an acknowledgement message (DSA-ACK) to the base station in response to the DSA-RSP message (S411), and connects call with the base station, so as to receive the emergency rescue service.

The uplink signal quality information of the mobile station, which has been received in the relay station in step S403, may be transmitted to the base station through step S407. In other words, if the mobile station transmits a bandwidth request header to the relay station to transmit the DSA-REQ message to the base station, the relay station transmits the bandwidth request header to the base station by adding information for corresponding uplink bandwidth request and signal quality information between the relay station and the mobile station to the bandwidth request header.

To this end, if it is necessary to identify signal quality information of the mobile station in a state that the relay station has received the emergency code, the base station allocates a bandwidth, which is sufficient to transmit the bandwidth request header and a CINR report header, to the relay station through CDMA-Allocation_IE.

The base station which has received the bandwidth request header and the CINR report header from each relay station can establish an optimized path by comparing signal quality information of one relay station with signal quality information of another relay station.

The steps S301, S303 and S308 of the aforementioned embodiment 1 and the steps S401, S406 and S411 of the aforementioned embodiment 2 can be performed without a network entry procedure of the mobile station, i.e., an authentication procedure of the mobile station to an access network. The network accepts the procedure to be omitted only if the mobile station transmits the emergency code. In this case, the initial ranging procedure is preferably performed for data received through a transmission interval of the emergency code.

Furthermore, since the base station can previously set QoS, SFID, and CID of the emergency rescue service to report the set QoS, SFID and CID to the mobile station, step S306 of the embodiment 1 and step S409 of the embodiment 2 can be omitted.

Figure 4:
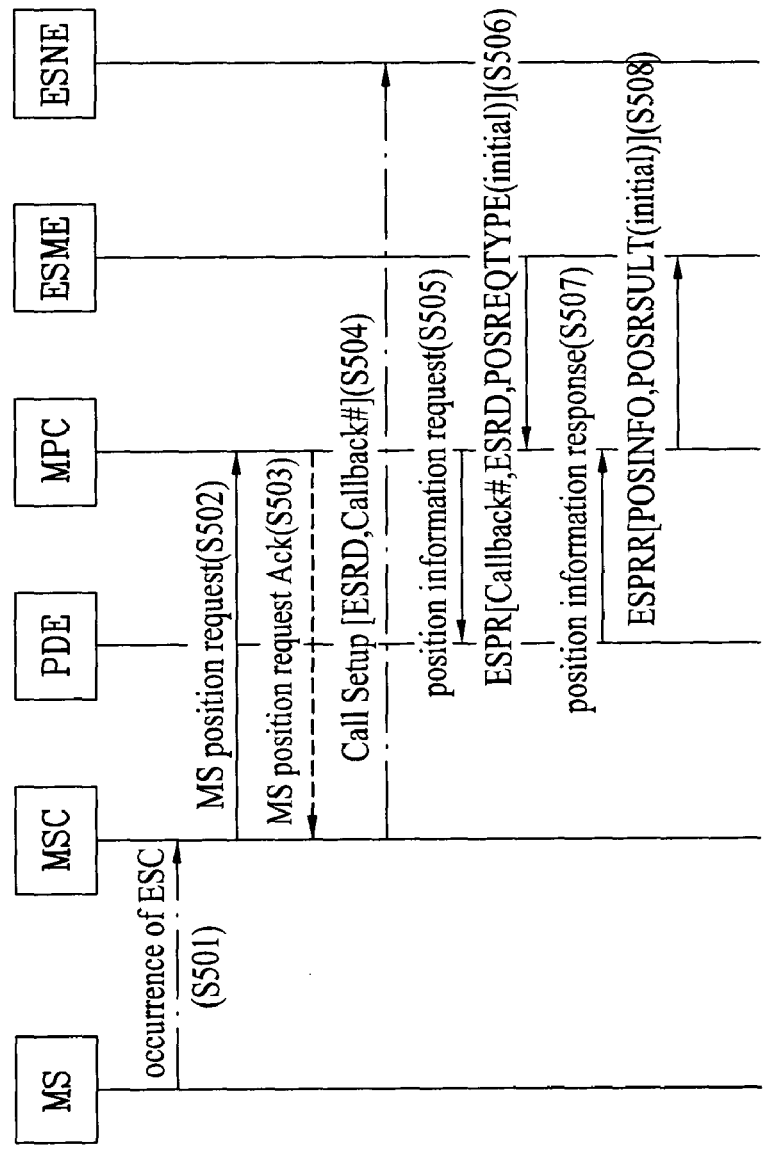
FIG. 4 is a signal flow chart illustrating a procedure of performing emergency rescue in an emergency rescue service network.

Meanwhile, when call for emergency rescue is connected to the base station by the embodiment 1 or the embodiment 2, a procedure of the emergency rescue in an emergency rescue service network will be described below. FIG. 4 is a signal flow chart illustrating the procedure.

First of all, various entities configuring the emergency rescue service network will be described in brief.

An emergency service message entity (ESME) is in charge of message processing and routing related to the emergency rescue service, and performs a function related to the emergency rescue service by interworking with an emergency service network entity (ESNE) and an automatic location identification (ALI) DB engine.

A mobile position center (MPC) interworks with a position determining entity (PDE) and a mobile switching center (MSC) to collect the position of the mobile station and performs a position information management function.

The mobile switching center (MSC) performs a call setup and relay function between wireless mobile communication subscribers or between a wireless mobile communication subscriber and an air network, and performs an interworking function with the emergency rescue service.

The emergency service network entity (ESNE) interworks with the MSC with respect to emergency call, and performs connection processing and routing in respect of general voice, a communication device for deafness and dumbness, and a teletypewriter service.

A position determining entity (PDE) provides a geographic position calculating function of the mobile station, and performs a function for measuring the position of the mobile station by using various position measuring methods and a unique position measuring algorithm.

The automatic location identification (ALI) provides position information and name related to a telephone number of a user who has requested emergency call.

The procedure of performing the emergency rescue service through the aforementioned entities configuring the network will be described below.

If call for emergency rescue occurs in the mobile station (S501), the mobile switching center (MSC) requests the mobile position center (MSC) of position information of the corresponding mobile station (S502).

The mobile position center (MPC) transmits an acknowledgement (ACK) message in response to the request of the MSC (S503). At this time, the acknowledgement message does not include position information of the mobile station, and is to report that the position information request has been normally received.

If the position information request is authenticated from the MPC, the MSC forwards emergency rescue call to the emergency rescue service network (S504).

The MPC requests the position determining entity (PDE) of position information asynchronously with the emergency rescue service network and acquires the position information (S505).

The emergency service network entity (ESNE) requests MPC of a wireless core network to provide position information of the request of the emergency rescue service (S506), and receives position information from the PDE through the MPC (S507, S508).

Figure 5:
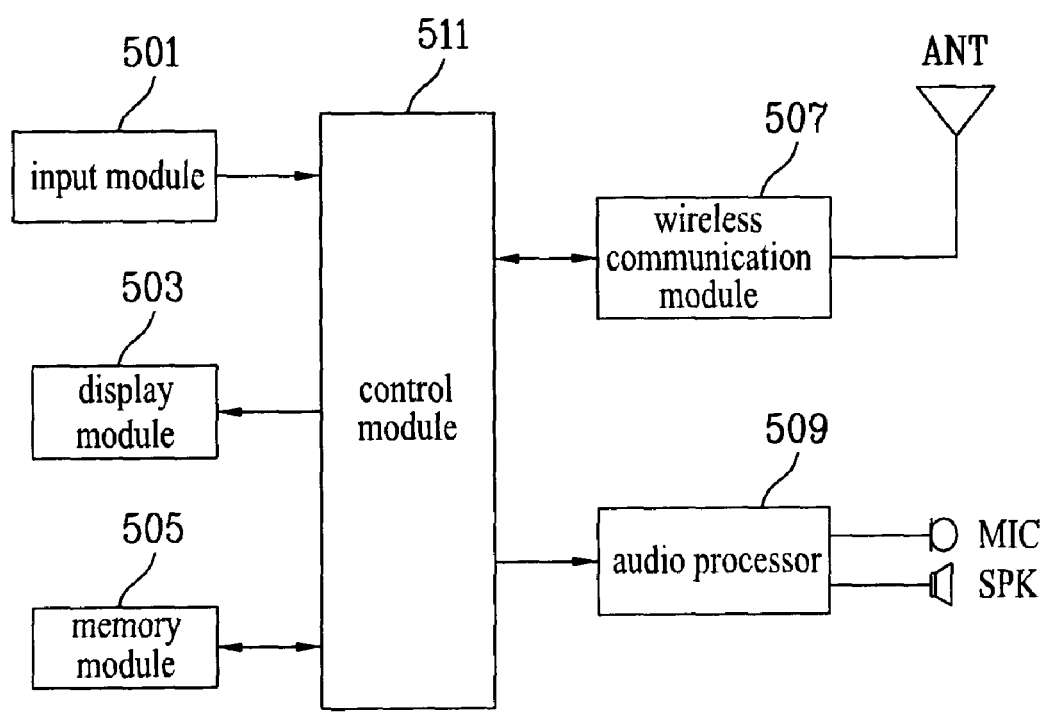
FIG. 5 is a block diagram illustrating a configuration of a mobile station according to the present invention.

Finally, a configuration of the mobile station which supports the emergency communication method according to the present invention will be described. FIG. 5 is a block diagram illustrating the configuration of the mobile station according to the present invention.

The mobile station includes an input module 501 selecting a desired function or inputting information, a display module 503 displaying various kinds of information for operating the mobile station, a memory module 505 storing various programs required to operate the mobile station and data to be transmitted to a receiving side, a wireless communication module 507 receiving an external signal and transmitting data to the receiving side, an audio processor 509 converting a digital audio signal into an analog audio signal, amplifying the converted audio signal, and outputting the amplified signal to a speaker (SP), or amplifying an audio signal from a mike (MIC) and converting the amplified signal into a digital signal, and a control module 511 controlling entire driving of the mobile station.

Particularly, the control module 511 requests the base station of emergency call connection through the wireless communication module 507, directly requests the base station to perform ranging and bandwidth allocation or requests the base station to perform ranging and bandwidth allocation through the relay station, and requests the base station to set a service flow for emergency rescue through a request path of the ranging and bandwidth allocation. To this end, the control module 511 identifies an uplink bandwidth allocated by the base station from an uplink map or an uplink information element of the uplink map.

Furthermore, with respect to the request of the service flow, the control module 511 can be reported from the base station through the wireless communication module 507 whether to support a corresponding service.

Meanwhile, examples of the mobile station according to the present invention include personal digital assistant (PDA), cellular phone, personal communication service (PCS) phone, global system for mobile (GSM) phone, wideband CDMA (WCDMA) phone, and mobile broadband system (MBS) phone.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention relates to a method and apparatus for requesting a base station of emergency call connection within the shortest time regardless of location or channel status of a mobile station in a mobile communication system. The present invention can be applied to IEEE 802.16e, IEEE 802.16m, and a base station, a relay station, and a mobile station of a system compatible with 802.16e and IEEE 802.16m.

What is claimed is:

1. A method of emergency communication in a mobile communication system, the method comprising:
    establishing a direct communication path between a base station and a mobile station and allocating a third uplink bandwidth for ranging request of the mobile station if a signal quality value of an emergency code directly received from the mobile station is greater than a signal quality value of an emergency code received through a relay station;
    allocating a fourth uplink bandwidth for a request of a service flow setup of the mobile station if size of emergency data and information of the mobile station are received from the mobile station through the third uplink bandwidth; and
    receiving the request of the service flow setup from the mobile station through the fourth uplink bandwidth.

2. The method of claim 1, wherein the step of allocating the uplink bandwidth for ranging request includes transmitting information of the third uplink bandwidth from the base station to the mobile station through an uplink information element of an uplink map.

3. The method of claim 1, wherein the emergency code directly received from the mobile station and the emergency code received through the relay station include a code for identifying a transmission start source of the emergency code.

4. The method of claim 1, wherein the emergency code directly received from the mobile station and the emergency code received through the relay station are transmitted through different emergency code transmission bandwidths.

5. The method of claim 1, further comprising reporting to the mobile station whether to support a corresponding service if the request of the service flow setup is received from the mobile station through the fourth uplink bandwidth.

* * * * *